US009208099B2

(12) United States Patent
Benhase et al.

(10) Patent No.: US 9,208,099 B2
(45) Date of Patent: *Dec. 8, 2015

(54) ADJUSTMENT OF THE NUMBER OF TASK CONTROL BLOCKS ALLOCATED FOR DISCARD SCANS

(75) Inventors: Michael T. Benhase, Tucson, AZ (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/569,951

(22) Filed: Aug. 8, 2012

(65) Prior Publication Data

US 2014/0047187 A1   Feb. 13, 2014

(51) Int. Cl.
| G06F 13/00 | (2006.01) |
| G06F 13/28 | (2006.01) |
| G06F 12/00 | (2006.01) |
| G06F 12/08 | (2006.01) |
| G06F 12/02 | (2006.01) |
| G06F 9/46  | (2006.01) |
| G06F 9/50  | (2006.01) |

(52) U.S. Cl.
CPC ............ *G06F 12/0871* (2013.01); *G06F 9/463* (2013.01); *G06F 9/5016* (2013.01); *G06F 12/023* (2013.01); *G06F 12/0802* (2013.01); *G06F 2209/504* (2013.01); *G06F 2212/604* (2013.01); *G06F 2212/6082* (2013.01); *Y02B 60/142* (2013.01)

(58) Field of Classification Search
CPC ........................................ G06F 9/50

USPC ................... 711/133–136, 143; 718/102–104
See application file for complete search history.

(56) References Cited

U.S. PATENT DOCUMENTS

| 4,875,155 | A  |    | 10/1989 | Iskiyan et al. |
| 7,191,207 | B2 | *  | 3/2007  | Blount et al. ................. 709/200 |
| 7,769,802 | B2 |    | 8/2010  | Smith et al. |
| 8,549,222 | B1 |    | 10/2013 | Kleiman et al. |
| 8,621,145 | B1 |    | 12/2013 | Kimmel et al. |
| 2004/0117441 | A1 |  | 6/2004 | Liu et al. |
| 2004/0260882 | A1 |  | 12/2004 | Martinez et al. |
| 2006/0069888 | A1 | * | 3/2006 | Martinez ....................... 711/162 |

(Continued)

FOREIGN PATENT DOCUMENTS

EP          1030243       10/2002

OTHER PUBLICATIONS

Smith, G., The Linux Page Cache and pdflush: Theory of Operation and Tuning for Write-Heavy Loads, 2007.*

(Continued)

*Primary Examiner* — Aimee Li
*Assistant Examiner* — Edmund Kwong
(74) *Attorney, Agent, or Firm* — Rabindranath Dutta; Konrad Raynes Davda & Victor LLP

(57) ABSTRACT

A controller receives a request to perform a release space operation. A determination is made that a new discard scan has to be performed on a cache, in response to the received request to perform the release space operation. A determination is made as to how many task control blocks are to be allocated to the perform the new discard scan, based on how many task control blocks have already been allocated for performing one or more discard scans that are already in progress.

13 Claims, 8 Drawing Sheets

(56) References Cited

U.S. PATENT DOCUMENTS

| | | | |
|---|---|---|---|
| 2006/0294301 A1* | 12/2006 | Zohar et al. | 711/113 |
| 2009/0222621 A1* | 9/2009 | Ash et al. | 711/112 |
| 2009/0249015 A1 | 10/2009 | Tzeng | |
| 2010/0037226 A1 | 2/2010 | Benhase et al. | |
| 2010/0257321 A1* | 10/2010 | Gupta | 711/138 |
| 2012/0198174 A1 | 8/2012 | Nellans et al. | |
| 2012/0239853 A1 | 9/2012 | Moshayedi | |
| 2012/0324173 A1* | 12/2012 | Benhase et al. | 711/141 |
| 2013/0042156 A1 | 2/2013 | Srinivasan et al. | |
| 2013/0138884 A1 | 5/2013 | Kawamura | |
| 2013/0262746 A1 | 10/2013 | Srinivasan | |
| 2013/0318283 A1 | 11/2013 | Small et al. | |
| 2014/0068163 A1 | 3/2014 | Benhase et al. | |
| 2014/0068189 A1 | 3/2014 | Benhase et al. | |
| 2014/0068191 A1 | 3/2014 | Benhase et al. | |

OTHER PUBLICATIONS

Shene, C.K., Multithreaded Programming with ThreadMentor: A Tutorial, Department of Computer Science, Michigan Technological University, Mar. 2011.*
U.S. Appl. No. 13/491,795, filed Jun. 8, 2012, entitled "Synchronous and Asynchronous Discard Scans Based on the Type of Cache Memory", by inventors M. Benhase, L.Gupta and Matthew J. Kalos, (18.427).
U.S. Appl. No. 13/491,818, filed Jun. 8, 2012, entitled "Performing Asynchronous Discard Scans With Staging and Destaging Operations", by inventors M. Benhase, and L.Gupta, (18.438).
Office Action dated May 5, 2014, pp. 31, for for U.S. Appl. No. 13/491,795, filed Jun. 8, 2012 (18.427).
Office Action dated May 16, 2014, pp. 21, for U.S. Appl. No. 14/073,545, filed Nov. 6, 2013 (18.427C1).
Office Action dated May 8, 2014, pp. 28, for U.S. Appl. No. 13/491,818, filed Jun. 8, 2012 (18.438).
Office Action dated May 8, 2014, pp. 22, for U.S. Appl. No. 14/073,551, filed Nov. 6, 2013 (18.438C1).
Response dated Jun. 20, 2014, pp. 17, to Office Action dated Mar. 20, 2014, pp. 15, for U.S. Appl. No. 14/073,570 filed Jun. 6, 2013 (18.439C1).
Batsakis et al., "AWOL: An Adaptive Write Optimizations Layer", Fast '08: 6th USENIX Conference on File and Storage Technologies, 2008, pp. 14.
Preliminary Remarks dated Nov. 6, 2013, pp. 2, for U.S. Appl. No. 14/073,570, filed Nov. 6, 2013 (18.439C1).
Preliminary Amendment dated Nov. 6, 2013, pp. 4, for U.S. Appl. No. 14/073,612, filed Nov. 6, 2013 (18.473C1).
U.S. Appl. No. 14/073,612, filed Nov. 6, 2013 (18.473C1).
Preliminary Amendment filed Jun. 11, 2012, pp. 3, for U.S. Appl. No. 13/491,795, filed Jun. 8, 2012 (18.427).
Preliminary Remarks dated Nov. 6, 2013, pp. 2, for U.S. Appl. No. 14/073,545, filed Nov. 6, 2013 (18.427C1).
Preliminary Remarks dated Nov. 6, 2013, pp. 2, for U.S. Appl. No. 14/073,551, filed Nov. 6, 2013 (18.438C1).
Office Action dated Mar. 20, 2014, pp. 15, for U.S. Appl. No. 14/073,570 filed Nov. 6, 2013 (18.439C1).
Response dated Aug. 5, 2014, pp. 14, to Office Action dated May 5, 2014, pp. 31, for for U.S. Appl. No. 13/491,795, filed Jun. 8, 2012 (18.427).
Response dated Aug. 8, 2014, pp. 22, to Office Action dated May 8, 2014, pp. 28, for U.S. Appl. No. 13/491,818, filed Jun. 8, 2012 (18.438).
Response dated Aug. 8, 2014, pp. 18, to Office Action dated May 8, 2014, pp. 22, for U.S. Appl. No. 14/073,551, filed Nov. 6, 2013 (18.438C1).
U.S. Appl. No. 13/747,351, filed Jan. 22, 2013 by inventors M. Benhase, et al.
Final Office Action dated Oct. 31, 2014, pp. 19, for U.S. Appl. No. 13/491,795, filed Jun. 8, 2012.
Office Action dated Aug. 29, 2014, pp. 29, for U.S. Appl. No. 14/073,612, filed Nov. 6, 2013.
Office Action dated Aug. 28, 2014, pp. 15, for U.S. Appl. No. 13/747,351, filed Jan. 22, 2013.
Final Office Action dated Nov. 6, 2014, pp. 21, for U.S. Appl. No. 13/491,818, filed Jun. 8, 2012.
Final Office Action dated Nov. 7, 2014, pp. 16, for U.S. Appl. No. 14/073,551, filed Nov. 6, 2013.
Notice of Allowance dated Sep. 9, 2014, pp. 24, for U.S. Appl. No. 14/073,570, filed Nov. 6, 2013.
Response filed Nov. 28, 2014, pp. 8, to Office Action dated Aug. 28, 2014, pp. 15, for U.S. Appl. No. 13/747,351, filed Jan. 22, 2013.
Response filed Dec. 1, 2014, pp. 6, to Office Action dated Aug. 29, 2014, pp. 29, for U.S. Appl. No. 14/073,612, filed Nov. 6, 2013.
U.S. Appl. No. 14/588,833, filed Jan, 2, 2015.
Final Office Action Nov. 6, 2014, pp. 17, for U.S. Appl. No. 14/073,545, filed Nov. 6, 2013.
Notice of Allowance dated Jan. 20, 2015, pp. 15, for U.S. Appl. No. 14/073,570, filed Nov. 6, 2013.
Response dated Feb. 2, 2015, pp. 8, to Final Office Action dated Oct. 31, 2014, pp. 19, for U.S. Appl. No. 13/491,795, filed Jun. 8, 2012.
Response dated Feb. 5, 2015, pp. 6, to Final Office Action Nov. 6, 2014, pp. 17, for U.S. Appl. No. 14/073,545, filed Nov. 6, 2013.
Response dated Feb. 5, 2015, pp. 13, to Final Office Action dated Nov. 6, 2014, pp. 21, for U.S. Appl. No. 13/491,818, filed Jun. 8, 2012.
Response dated Feb. 9, 2015, pp. 9, to Final Office Action dated Nov. 7, 2014, pp. 16, for U.S. Appl. No. 14/073,551, filed Nov. 6, 2013.
Final Office Action dated Feb. 23, 2015, pp. 24, for U.S. Appl. No. 13/747,351, filed Jan. 22, 2013.
Final Office Action dated Feb. 12, 2015, pp. 24, for U.S. Appl. No. 14/073,612, filed Nov. 6, 2013.
Notice of Allowance dated Jun. 18-20, 2015, pp. 11, for U.S. Appl. No. 14/073,545, filed Nov. 6, 2013.
Notice of Allowance dated Jun. 10, 2015, pp. 18, for U.S. Appl. No. 13/747,351, filed Jan. 22, 2013.
Office Action dated Jun. 19, 2015, pp. 39, for U.S. Appl. No. 14/588,833, filed Jan. 2, 2015.
Notice of Allowance dated Jun. 22, 2015, pp. 13, for U.S. Appl. No. 14/073,612, filed Nov. 6, 2013.
Notice of Allowance dated May 8, 2015, pp. 36, for U.S. Appl. No. 13/491,795, filed Jun. 8, 2012.
Notice of Allowance dated May. 20, 2015, pp. 33, for U.S. Appl. No. 14/073,545, filed Nov. 6, 2013.
Office Action dated May 21, 2015, pp. 29, for U.S. Appl. No. 13/491,818, filed Jun. 8, 2012.
Office Action dated May 19, 2015, pp. 22, for U.S. Appl. No. 14/073,551, filed Nov. 6, 2013.
Response filed May 12, 2015, pp. 6, to Final Office Action dated Feb. 12, 2015, pp. 24, for U.S. Appl. No. 14/073,612, filed Nov. 6, 2013.
Response filed May 21, 2015, pp. 8, to Final Office Action dated Feb. 23, 2015, pp. 24, for U.S. Appl. No. 13/747,351, filed Jan. 22, 2013.
Notice of Allowance dated May 19, 2015, pp. 18, for U.S. Appl. No. 14/073,612, filed Nov. 6, 2013.
Response filed Aug. 21, 2015, pp. 14, to Office Action dated May 21, 2015, pp. 29, for U.S. Appl. No. 13/491,818, filed Jun. 8, 2012.
Response filed Aug. 19, 2015, pp. 10, to Office Action dated May 19, 2015, pp. 22, for U.S. Appl. No. 14/073,551, filed Nov. 6, 2013.
Notice of Allowance dated Sep. 1, 2015, pp. 13, for U.S. Appl. No. 14/073,551, filed Nov. 6, 2013.
U.S. Appl. No. 14/852,123, filed Sep. 11, 2015.
U.S. Appl. No. 14/849,415, filed Sep. 9, 2013.
Notice of Allowance dated Sep. 17, 2015 for U.S. Appl. No. 13/491,818, filed Jun. 8, 2012.
Response dated Sep. 21, 2015, pp. 13, to Office Action dated Jun. 19, 2015, pp. 39, for U.S. Appl. No. 14/588,833, filed Jan. 2, 2015.

* cited by examiner

ADJUSTMENT OF THE NUMBER OF TASK CONTROL BLOCKS ALLOCATED FOR DISCARD SCANS

BACKGROUND

1. Field

The disclosure relates to a method, system, and article of manufacture for the adjustment of the number of task control blocks allocated for discard scans.

2. Background

A storage controller may be coupled to one or more of a plurality of hosts. The storage controller may manage a plurality of storage devices, such as disk drives, tape drives, etc., that are coupled to the storage controller. The plurality of hosts may access data stored in the storage devices via the storage controller.

The storage controller may maintain a cache, where a cache is a type of storage that is capable of providing faster access to data in comparison to storage devices such as disk drives or tape drives. The storage space provided by the cache is smaller in size than the storage space provided by the disk drives or tape drives, where the storage provided by the disk drives or tape drives, and other devices, may be referred to as secondary storage. As a result, tracks may need to be staged (i.e., moved to the cache from secondary storage) or destaged (i.e., moved from the secondary storage to the cache) to prevent the cache from becoming full and to provide faster access to data. In many situations, to release space in the cache, tracks may be discarded from the cache via discard scans.

A "Task Control Block" (TCB) is a data structure in the operating system kernel containing the information needed to manage a particular process. Storage controllers may move information to and from storage devices, and to and from the cache by using TCBs to manage the movement of data.

SUMMARY OF THE PREFERRED EMBODIMENTS

Provided are a method, a system, and a computer program product in which a controller receives a request to perform a release space operation. A determination is made that a new discard scan has to be performed on a cache, in response to the received request to perform the release space operation. A determination is made as to how many task control blocks are to be allocated to the perform the new discard scan, based on how many task control blocks have already been allocated for performing one or more discard scans that are already in progress.

In certain embodiments, in response to determining that the already allocated number of task control blocks exceed a threshold, only one task control block is allocated to perform the new discard scan.

In further embodiments, in response to determining that the already allocated number of task control blocks does not exceed a threshold, a plurality of task control blocks are allocated to perform the new discard scan.

In yet further embodiments, the allocating of the plurality of task control blocks to perform the new discard scan further comprises, allocating an anchor task control block and then allocating subscan task control blocks to perform the new discard scan, wherein the anchor task control block and each of the subscan task control blocks are executed in parallel.

In additional embodiments, a determination is made as to whether input/output (I/O) operations on the cache that cannot be performed exceed a threshold number of I/O operations, wherein the I/O operations cannot be performed because of the discard scans that are already in progress. In response to determining that the I/O operations on the cache that cannot be performed exceed the threshold number of I/O operations, an increased number of task control blocks are allocated for each new discard scan if additional task control blocks are available.

In yet additional embodiments, the number of task control blocks allocated for all discard scans do not exceed ten percent of a total of task control blocks in the controller.

In further embodiments, a determination is made that no additional task control blocks are available to allocate to the new discard scan. The new discard scan is queued until a task control block is made available via completion of at least one of the discard scans that are already in progress.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Storage space may be released in a storage controller for a plurality of reasons. In certain embodiments, storage space may be released when a volume is deleted. In other embodiments, storage space may be released, in response to receiving a host command to reclaim storage space. In certain embodiments, a flash cache is maintained in the storage controller to provide faster access to data to the host. For space to be released, tracks in flash cache may have to be discarded. A discard scan needs to scan the cache directory and discard tracks corresponding to the space being released. In certain embodiments, flash cache discard scans are performed asynchronously with respect to requests for space release received from the host.

In certain embodiments, it is possible that there may be too many of flash cache discard scans running at some point in time, where the flash cache discard scans use a large number of task control blocks. Certain embodiments throttle the total number of task control blocks running at any given time, if the total number of task control blocks exceed a threshold. In certain other embodiments, the number of task control blocks allocated to new discard scans may be increased if enough task control blocks are available.

Exemplary Embodiments

Figure 1:
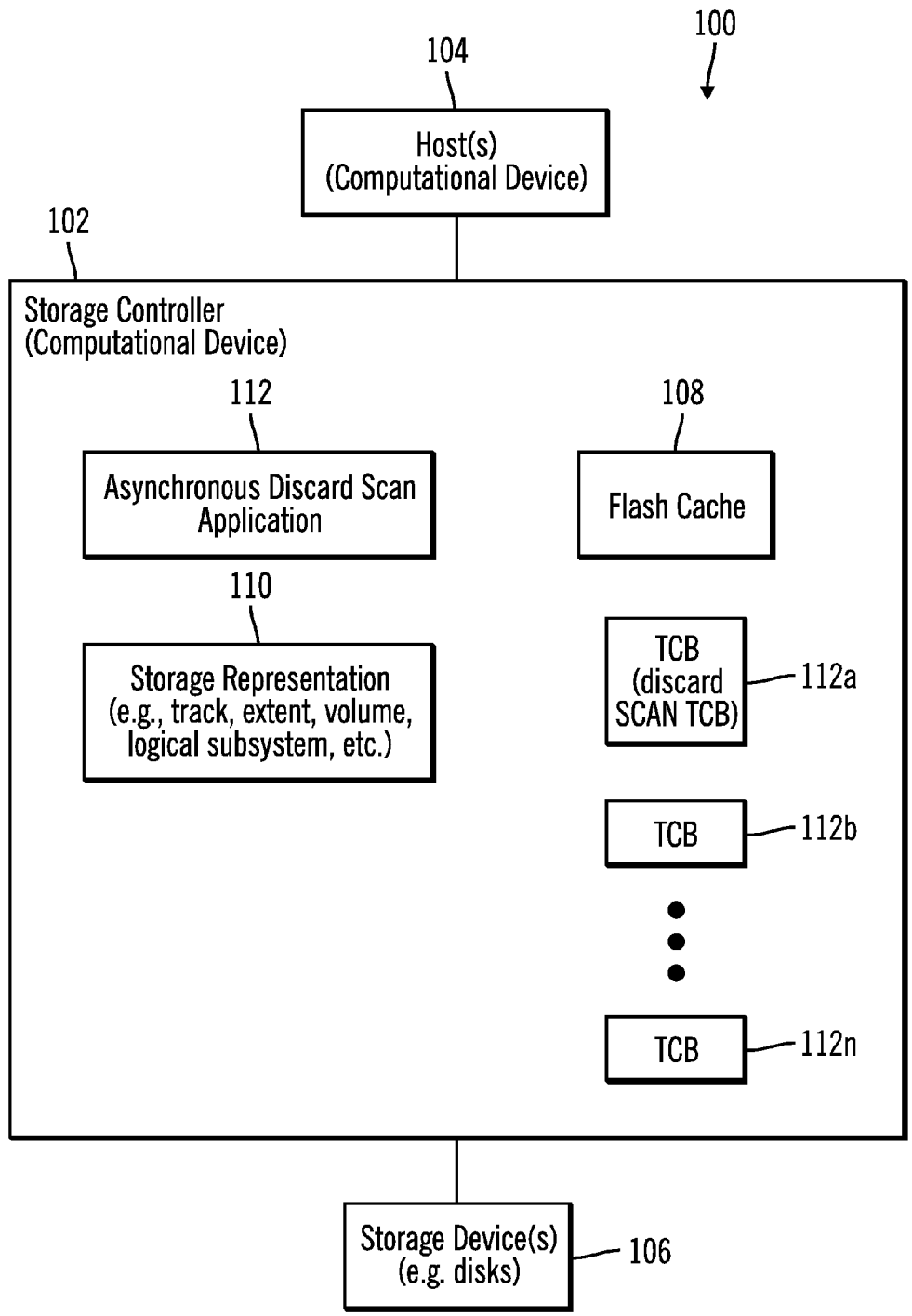
FIG. 1 illustrates a block diagram of a computing environment that includes a storage controller coupled to a host, in accordance with certain embodiments.

FIG. 1 illustrates a block diagram of a computing environment 100 that includes a storage controller 102 coupled to one or more hosts 104, in accordance with certain embodiments. The storage controller manages storage for the host 104, by controlling one or more storage devices 106.

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a server, etc. The storage devices 106 may comprise any suitable storage device including those presently known in the art, such as magnetic disks, optical disks, tapes, etc. In certain embodiments, the host 104, the storage controller 102, and the storage devices 106 may be coupled via a network, such as the Internet, an intranet, a storage area network, a local area network, etc.

The storage controller 102 may include a flash cache 108. In certain embodiments, the flash cache 108 may be comprised of a plurality of solid state disks. The flash cache 108 may provide caching services to cache data and provide faster access to data stored in the storage devices 106. The data stored in the flash cache 108 and any other storage media either inside or coupled to the storage controller 102 may be represented via storage representations 110, such as tracks, extents, volumes, logical subsystems, etc.

The storage controller 102 also includes an asynchronous discard scan application 112 that executes in the storage controller 102. The asynchronous discard scan application 112 may be implemented in software, firmware, hardware, or any combination thereof. The asynchronous discard scan application 112 when executed may perform discard scan processes that are used to determine tracks to be discarded from the flash cache 108, to release space in the flash cache 108.

The storage controller 102 may also maintain a plurality of task control blocks 112a, 112b . . . 112n that are used for performing discard scans. Such task control blocks 112a . . . 112n may be referred to as discard scan TCBs.

Therefore, FIG. 1 illustrates certain embodiments in which a storage controller 102 maintains a flash cache 108 from which space may be released via an asynchronous discard scan application 112. Certain embodiments allow throttling of task control blocks based on the number of task control blocks that are already being executed. Throttling of task control blocks means that the number of task control blocks are not allowed to grow very fast, or are stabilized in number, or are reduced in number.

Figure 2:
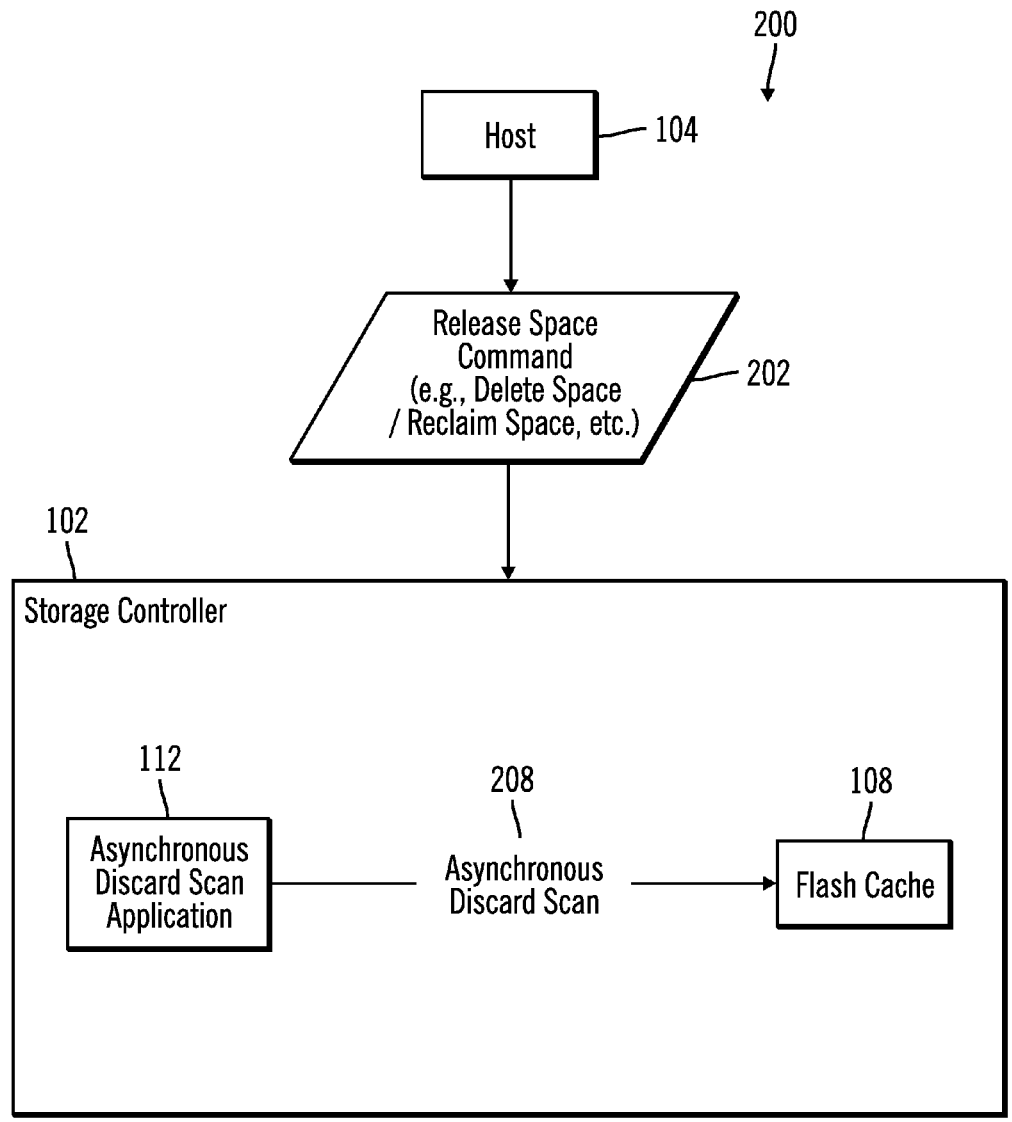
FIG. 2 illustrates a block diagram that shows asynchronous discard scans being performed in a storage controller, in accordance with certain embodiments.

FIG. 2 illustrates a block diagram 200 that shows asynchronous discard scans being performed in the storage controller 102, in accordance with certain embodiments.

In certain embodiments, the host 104 (acting as a client) may send the storage controller 102 a release space command 202, where the release space command 202 may request that space is to be released by the storage controller 102. The release of space may occur through various mechanisms, such as deletion of space, reclamation of space, etc.

The storage controller 102 receives the release space command 202, and in response the asynchronous discard scan application 112 may start an asynchronous discard scan process 208 to scan a flash cache directory corresponding to the flash cache 108, to determine tracks that are to be discarded from the flash cache 108. The asynchronicity of the asynchronous discard scan process 208 is with respect to the release space command 202, i.e., the release space command 202 does not wait for completion while the asynchronous discard scan process 208 is being executed.

Tracks are discarded asynchronously from the flash cache 108 because the memory size and the number of tracks in the flash cache 108 are of a sufficiently large magnitude, such that the release space command 202 may fail via timeouts, etc., should the release space command 202 wait while tracks are being discarded from the flash cache 108.

Figure 3:
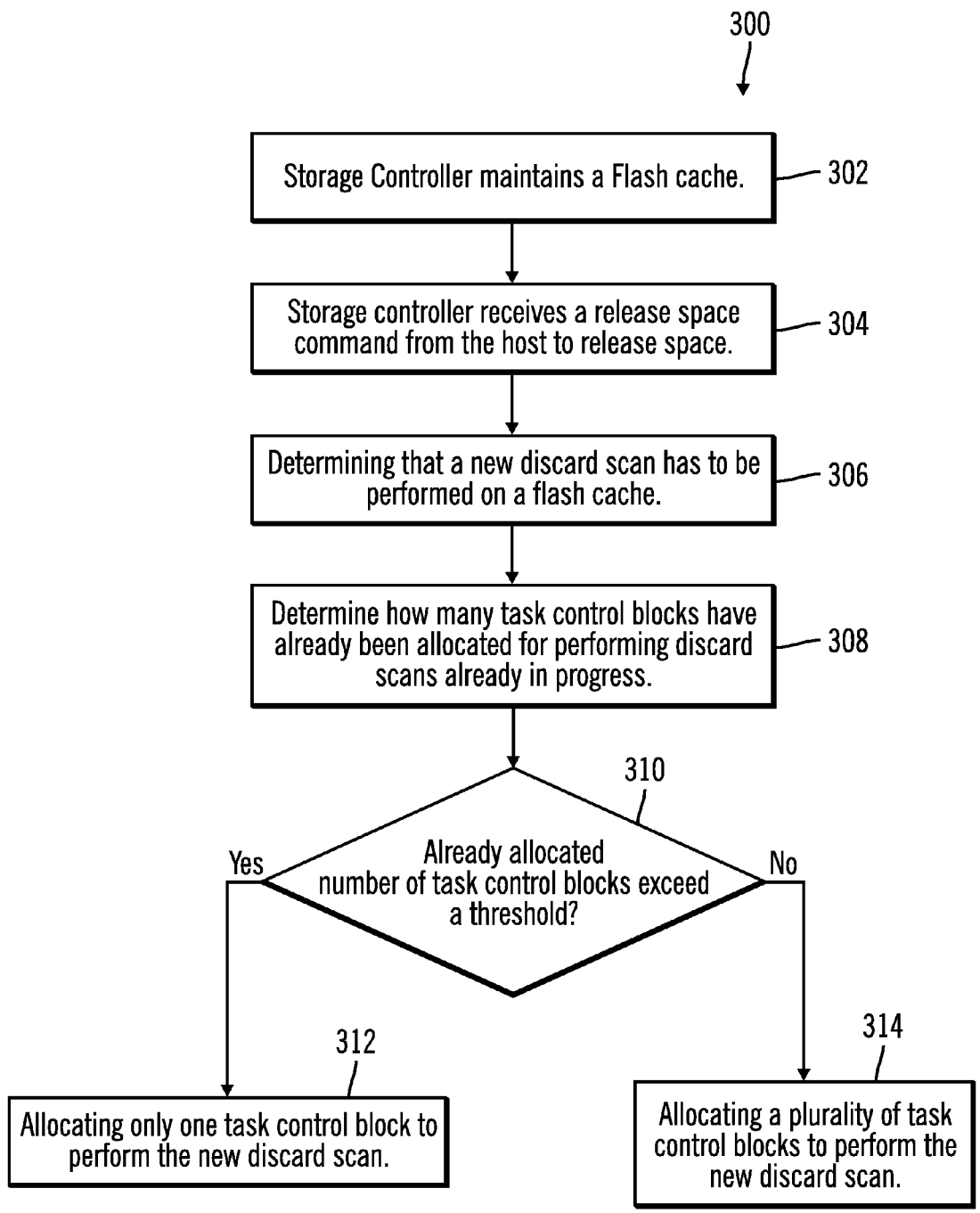
FIG. 3 illustrates flowchart that shows allocation of task control blocks for asynchronous discard of tracks in a flash cache, in accordance with certain embodiments.

FIG. 3 illustrates flowchart 300 that shows allocation of task control blocks for asynchronous discard of tracks in a flash cache 108, in accordance with certain embodiments.

Control starts at block 302 in which the storage controller 102 maintains a flash cache 108. The storage controller 102 receives (at block 304) a release space command 202 from the host 104 to release space. To satisfy the release space command 202, the storage controller 102 determines (at block 306) that a new discard scan has to be performed on a flash cache 108. The discard scan determines which tracks to discard from the flash cache 108.

Control proceeds to block 302 in which the storage controller 102 determines how many task control blocks have already been allocated for performing discard scans already in progress. If the allocated number of task control blocks exceed a threshold ("Yes" branch from block 310) then in certain embodiments, one task control block is allocated (at block 312) to perform the new discard scan. If the allocated number of task control blocks does not exceed a threshold ("No" branch from block 310) then a plurality of task control blocks are allocated (at block 314) to perform the new discard scan.

Therefore, FIG. 3 illustrates certain embodiments in which a determination is made as to how many task control blocks are to be allocated to the perform the new discard scan, based on how many task control blocks have already been allocated for performing one or more discard scans that are already in progress. In certain embodiments, in response to determining that the already allocated number of task control blocks exceed a threshold, only one task control block is allocated to perform the new discard scan. In other embodiments, in response to determining that the already allocated number of task control blocks does not exceed a threshold, a plurality of task control blocks are allocated to perform the new discard scan. The threshold may be set by a system administrator or may be determined by analyzing historical performance data collected on the efficiency of discard scan operations based on various tentative thresholds.

Figure 4:
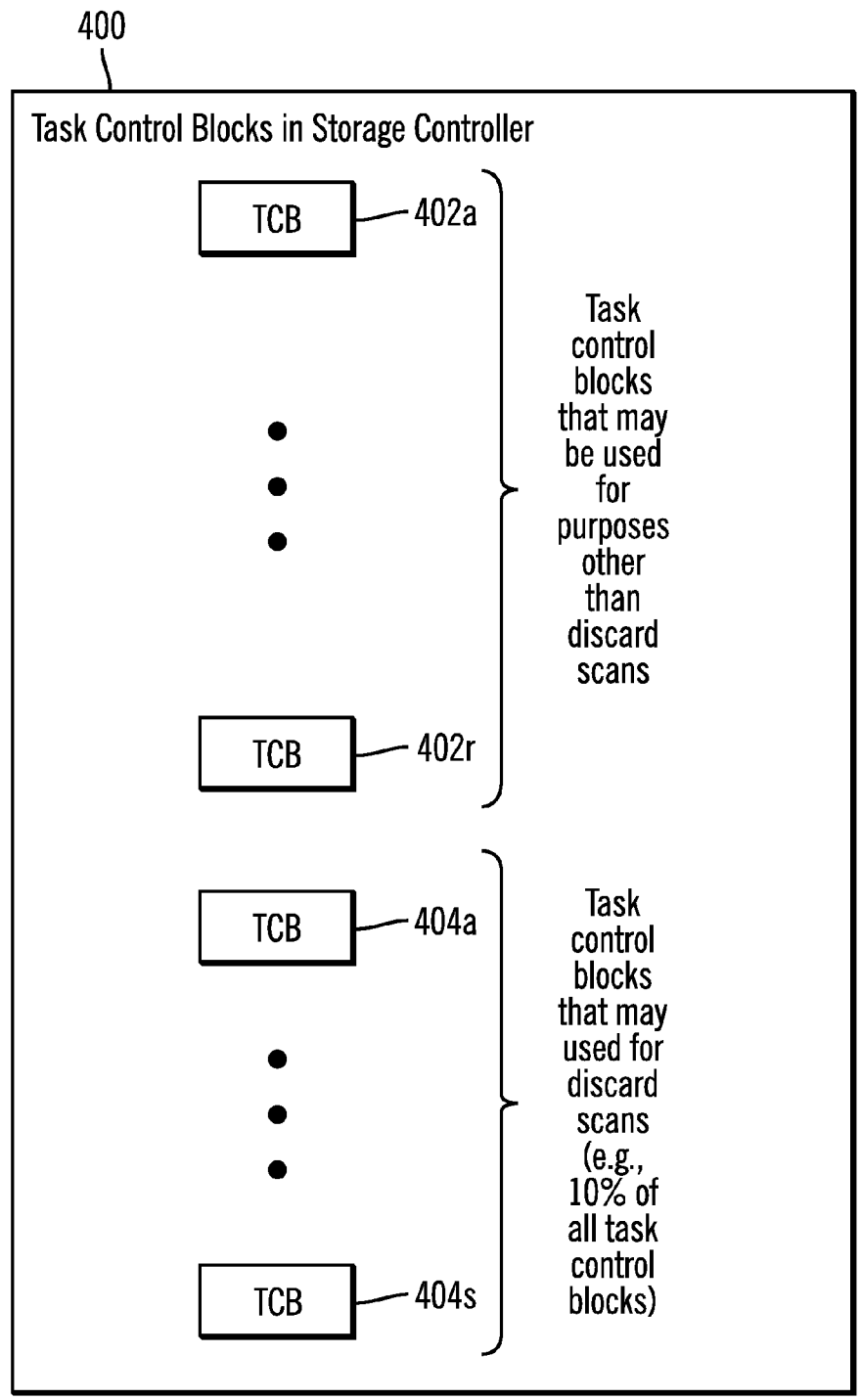
FIG. 4 illustrates a block diagram that shows allocation of task control blocks for different tasks, in accordance with certain embodiments.

FIG. 4 illustrates a block diagram 400 that shows allocation of task control blocks for different tasks in the storage controller 102, in accordance with certain embodiments. In FIG. 4 the task control blocks 402a . . . 402r may be used for purposes other than discard scans, whereas the task control blocks 404a . . . 404s may be used for discard scans. In certain embodiments, the total number of task control blocks that may be used for discard scans is limited to be no more than 10% of the total number of task control blocks in the storage controller 102. Therefore, certain embodiments attempt to manage the total number of task control blocks that are allocated for discard scans, and if too many task control blocks are already allocated then try to slow down the amount of new allocation of task control blocks for discard scans.

Figure 5:
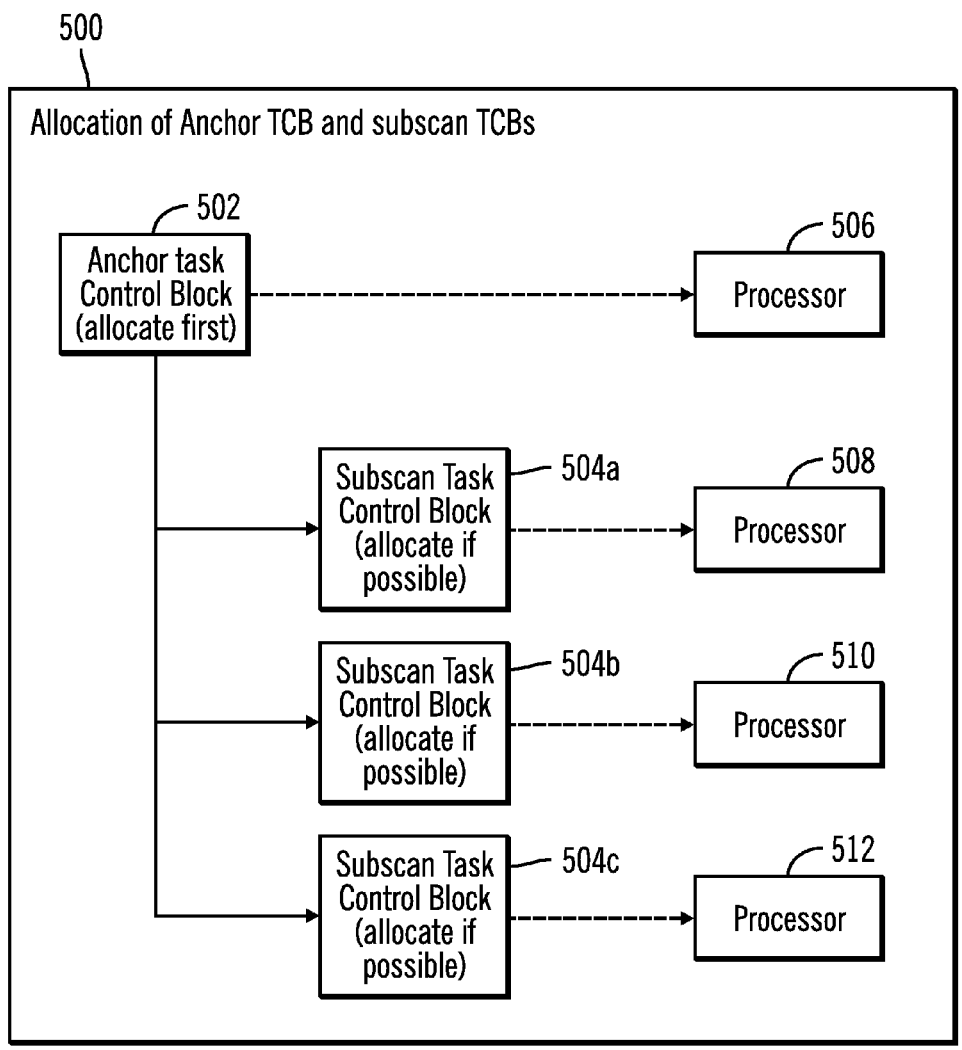
FIG. 5 illustrates a block diagram that shows the allocation of an anchor task control block and subscan task control blocks, in accordance with certain embodiments.

FIG. 5 illustrates a block diagram 500 that shows the allocation of an anchor task control block and subscan task control blocks 504a, 504b, 504c, in accordance with certain embodiments. In certain embodiments, here are two levels of throttling for discard scans. In certain embodiments, a release space request from a client may request a discard scan from a flash cache. The release space may first synchronously allocate an anchor task control block (TCB) 502 for performing the discards. Once the anchor TCB 502 is allocated, then a response can be returned to the client to indicate completion of the flash cache discard scan. If there are enough overall TCBs allocated for flash cache discard scans (e.g., 10% of the maximum number of TCBs may be enough) then the discard scans may wait for a TCB to be freed from one of the running discard scan. In such embodiments, the client for the discard scan may be requested to wait, until a TCB can be allocated to this discard scan by freeing up TCBs from running discard scans. This is the first level of throttling. Additionally, once an anchor TCB is allocated, the discard scan may try to allocate subscan TCBs 504a . . . 504e to process discard requests in parallel. It may be noted that the anchor TCB 502, and each of the subscan TCBs 504a, 504b, 504c execute on different processors 506, 508, 510, 512. If there are enough overall TCBs allocated for flash discard scans then subscan TCBs may not be allocated. This is the second level of throttling for discard scans (1 to 2% of the maximum number of TCBs may be allocated in this level of throttling).

Figure 6:
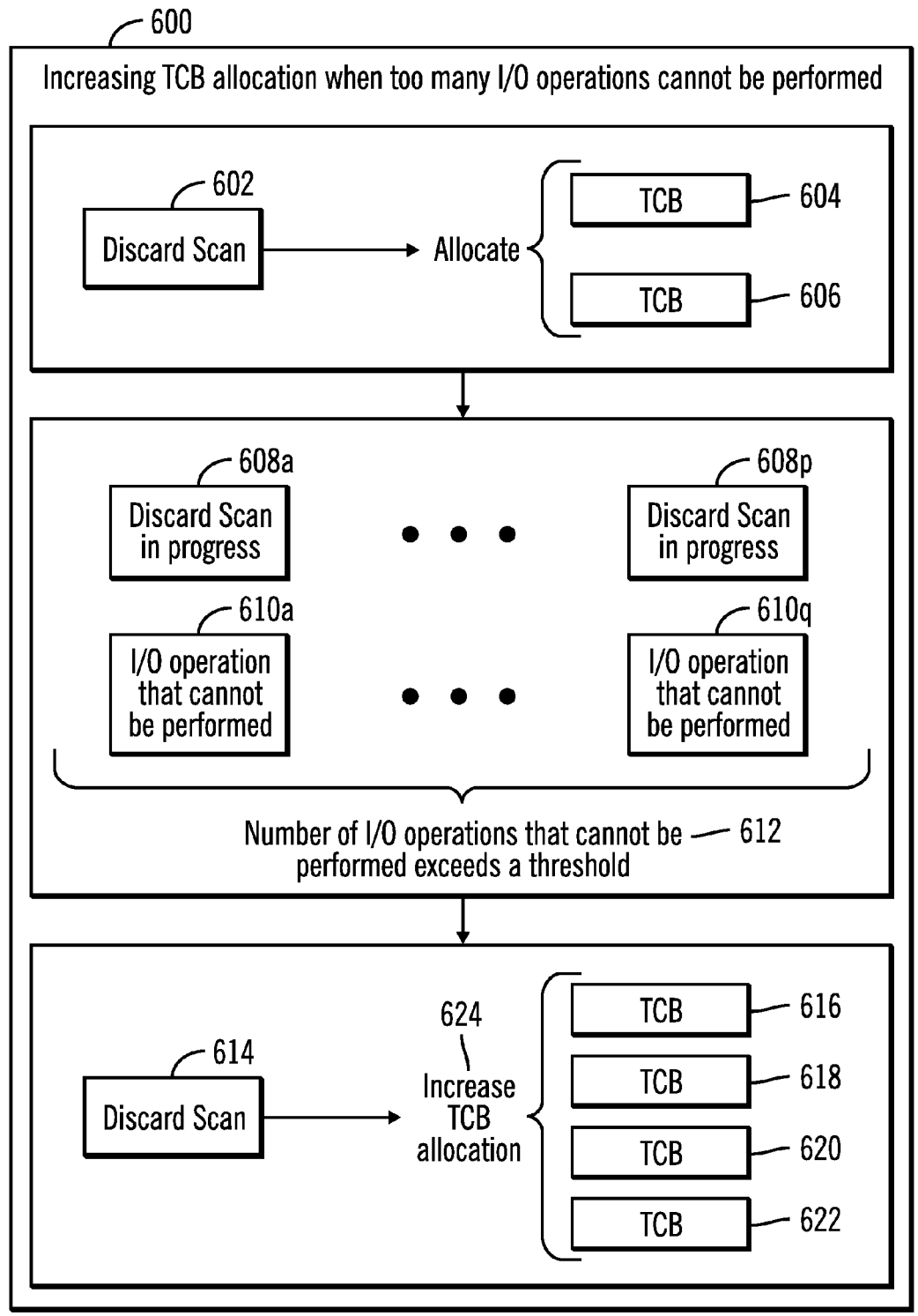
FIG. 6 illustrates a block diagram that shows how task control block allocations are increased when too many I/O operations cannot be performed, in accordance with certain embodiments.

FIG. 6 illustrates a block diagram 600 that shows how task control block allocations are increased when too many I/O operations cannot be performed, in accordance with certain embodiments.

In FIG. 602, initially anew discard scan 602 is allocated two TCBs 604, 606. After a certain amount of time, there may be many discard scans 608a . . . 608p in progress. However, it is possible that a number of I/O operations 610a . . . 610q cannot be performed on the flash cache 108 because when discard scans are in progress on areas of the flash cache, I/O operations cannot be performed to those areas.

In such embodiments, if the number of I/O operations that cannot be performed exceeds a threshold (reference numeral 612) then new discard scans 614 may be allocated four TCBs 616, 618, 620, 622 by increasing the allocation of TCBs (reference numeral 624), provided enough TCBs are available.

Figure 7:
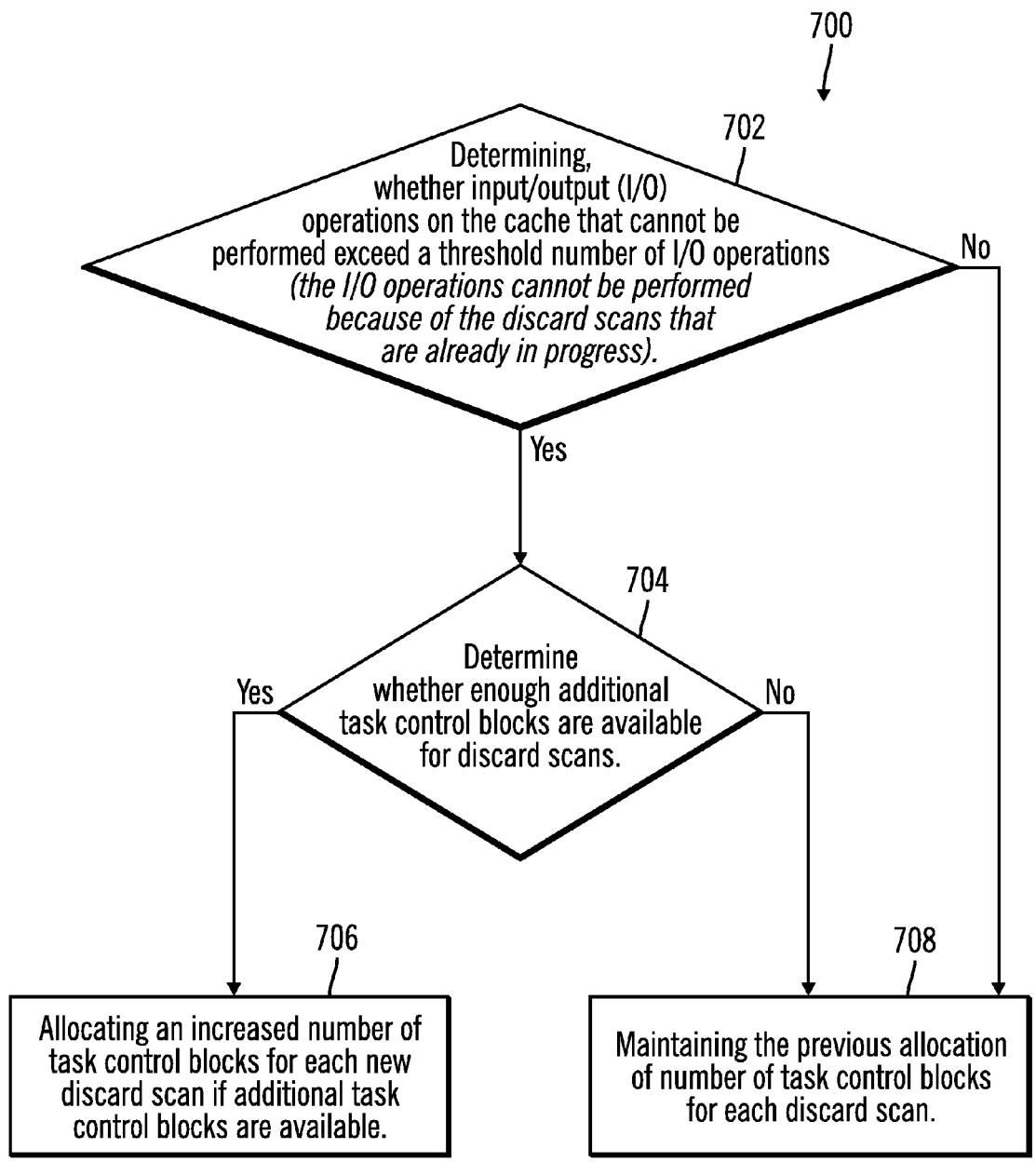
FIG. 7 illustrates a flowchart that shows how task control blocks are allocated, in accordance with certain embodiments.

FIG. 7 illustrates a flowchart 700 that shows how task control blocks are allocated, in accordance with certain embodiments.

Control starts at block 702, in which a determination is made as to whether input/output (I/O) operations on the cache 108 that cannot be performed exceed a threshold number of I/O operations, wherein the I/O. cannot be performed because of the discard scans that are already in progress.

If at block 702 it is determined that the input/output (I/O) operations on the cache 108 that cannot be performed exceed a threshold number of I/O operations ("Yes" branch from block 702) control proceeds to block 704 in which a determination is made as to whether there are enough additional task control blocks available for discard scans.

From block 704, control proceeds to block 706 if enough additional task control blocks are available ("Yes" branch from block 704) and an increased number of task control blocks are allocated (at block 706) for each new discard scan.

If at block 702 it is determined that the number of I/O operations on the cache 108 that cannot be performed does not exceed a threshold ("No" branch from block 702) or that not enough additional task control blocks are available for discard scans ("No" branch from block 704) then control proceeds to block 708 in which the previous allocation of the number of task control blocks are maintained for each discard scan.

Therefore, FIGS. 1-7 illustrate certain embodiments in which the allocation of task control blocks for new discard scans are adjusted based on how many task control blocks are already in use, how many task control blocks are available, and/or how many I/O operations on the flash cache are waiting because of the discard scans in progress. The throttling of task control blocks may be performed in a plurality of levels.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RE, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
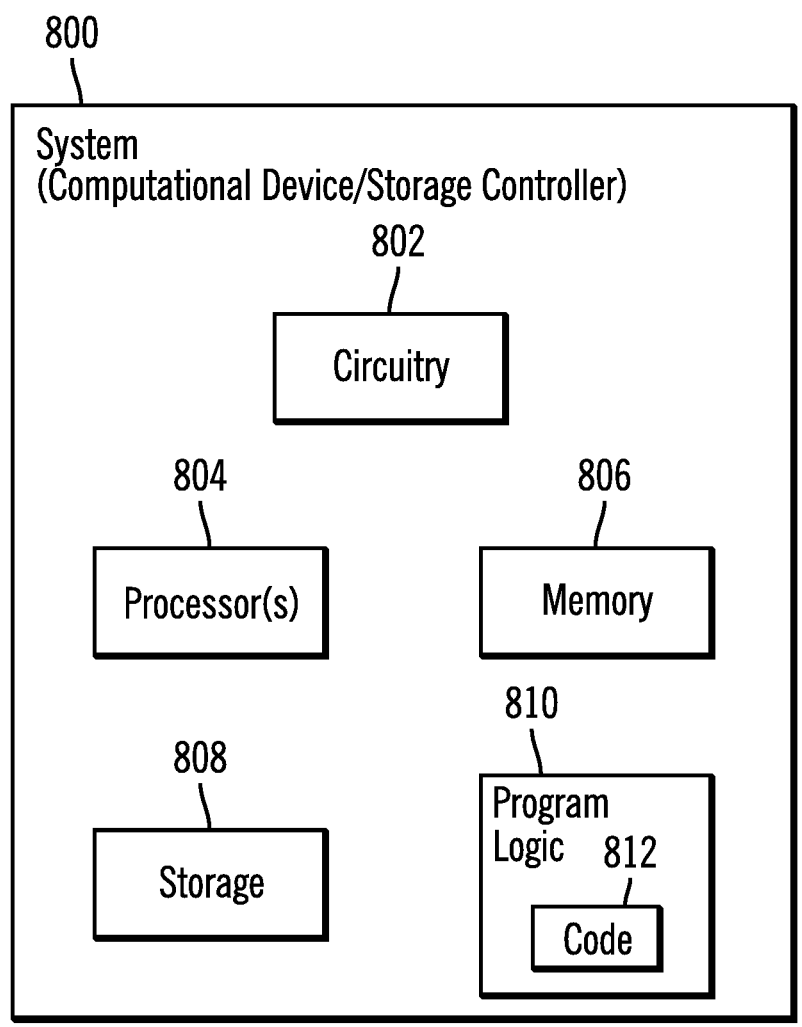
FIG. 8 illustrates a block diagram of a computational system that shows certain elements that may be included in at least the storage controller of FIG. 1, in accordance with certain embodiments.

FIG. 8 illustrates a block diagram that shows certain elements that may be included in the storage controller 102 in accordance with certain embodiments. The system 800 may comprise the storage controller 102 and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system coupled to a cache, the system comprising:
a memory; and
a processor coupled to the memory, wherein the processor performs operations, the operations comprising:
receiving a request to perform a release space operation;
determining that a new discard scan has to be performed on the cache, in response to the received request to perform the release space operation; and
determining how many task control blocks are to be allocated to perform the new discard scan, based on how many task control blocks have already been allocated for performing one or more discard scans that are already in progress, the operations further comprising:
determining, whether input/output (I/O) operations on the cache that cannot be performed exceed a threshold number of I/O operations, wherein the I/O operations cannot be performed because of discard scans that are already in progress; and
in response to determining that the I/O operations on the cache that cannot be performed exceed the threshold number of I/O operations, allocating an increased number of task control blocks for each new discard scan if additional task control blocks are available.

2. The system of claim 1, the operations further comprising:
in response to determining that the already allocated number of task control blocks exceed another threshold, allocating only one task control block to perform the new discard scan.

3. The system of claim 1, the operations further comprising:
in response to determining that the already allocated number of task control blocks does not exceed another threshold, allocating a plurality of task control blocks to perform the new discard scan.

4. The system of claim 3, wherein the allocating of the plurality of task control blocks to perform the new discard scan further comprises:
allocating an anchor task control block and then allocating subscan task control blocks to perform the new discard scan, wherein the anchor task control block and each of the subscan task control blocks are executed in parallel.

5. The system of claim 1, wherein the number of task control blocks allocated for all discard scans do not exceed ten percent of a total of task control blocks in the controller.

6. The system of claim 1, the operations further comprising:
determining that no additional task control blocks are available to allocate to the new discard scan; and
queuing the new discard scan until a task control block is made available via completion of at least one of the discard scans that are already in progress.

7. A computer program product, the computer program product comprising
a non-transitory computer readable storage medium having computer readable program code embodied therewith, the computer readable program code configured to perform operations on a controller coupled to a cache, the operations comprising:
receiving, by the controller, a request to perform a release space operation;
determining that a new discard scan has to be performed on the cache, in response to the received request to perform the release space operation; and
determining how many task control blocks are to be allocated to perform the new discard scan, based on how many task control blocks have already been allocated for performing one or more discard scans that are already in progress, the operations further comprising:
determining, whether input/output (I/O) operations on the cache that cannot be performed exceed a threshold number of I/O operations, wherein the I/O operations cannot be performed because of discard scans that are already in progress; and
in response to determining that the I/O operations on the cache that cannot be performed exceed the threshold number of I/O operations, allocating an increased number of task control blocks for each new discard scan if additional task control blocks are available.

8. The computer program product of claim 7, the operations further comprising:
in response to determining that the already allocated number of task control blocks exceed another threshold, allocating only one task control block to perform the new discard scan.

9. The computer program product of claim 7, the operations further comprising:
in response to determining that the already allocated number of task control blocks does not exceed another threshold, allocating a plurality of task control blocks to perform the new discard scan.

10. The computer program product of claim 9, wherein the allocating of the plurality of task control blocks to perform the new discard scan further comprises:
allocating an anchor task control block and then allocating subscan task control blocks to perform the new discard scan, wherein the anchor task control block and each of the subscan task control blocks are executed in parallel.

11. The computer program product of claim 7, wherein the number of task control blocks allocated for all discard scans do not exceed ten percent of a total of task control blocks in the controller.

12. The computer program product of claim 7, the operations further comprising:
determining that no additional task control blocks are available to allocate to the new discard scan; and
queuing the new discard scan until a task control block is made available via completion of at least one of the discard scans that are already in progress.

13. A storage controller coupled to a host, the storage controller comprising:
a processor;
a cache coupled to the processor, wherein the storage controller performs operations, the operations comprising:
receiving a request to perform a release space operation;
determining that a new discard scan has to be performed on the cache, in response to the received request to perform the release space operation; and determining how many task control blocks are to be allocated to perform the new discard scan, based on how many task control blocks have already been allocated for performing one or more discard scans that are already in progress, the operations further comprising:

determining, whether input/output (I/O) operations on the cache that cannot be performed exceed a threshold number of I/O operations, wherein the I/O operations cannot be performed because of discard scans that are already in progress; and in response to determining that the I/O operations on the cache that cannot be performed exceed the threshold number of I/O operations, allocating an increased number of task control blocks for each new discard scan if additional task control blocks are available.

* * * * *